April 14, 1964   L. KAUFMAN ETAL   3,128,968
AIRCRAFT CONTROL SERVO APPARATUS HAVING SIGNAL MEMORIZING MEANS
Filed Oct. 25, 1961
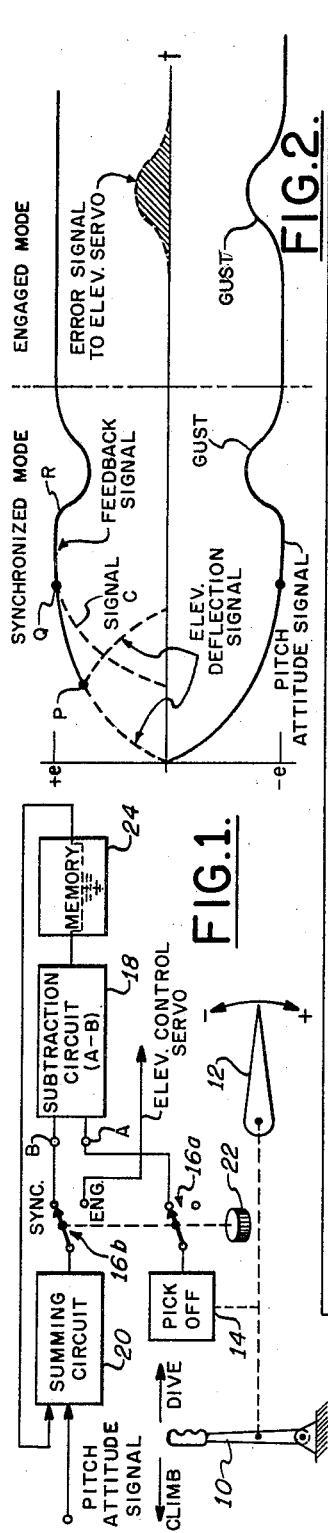
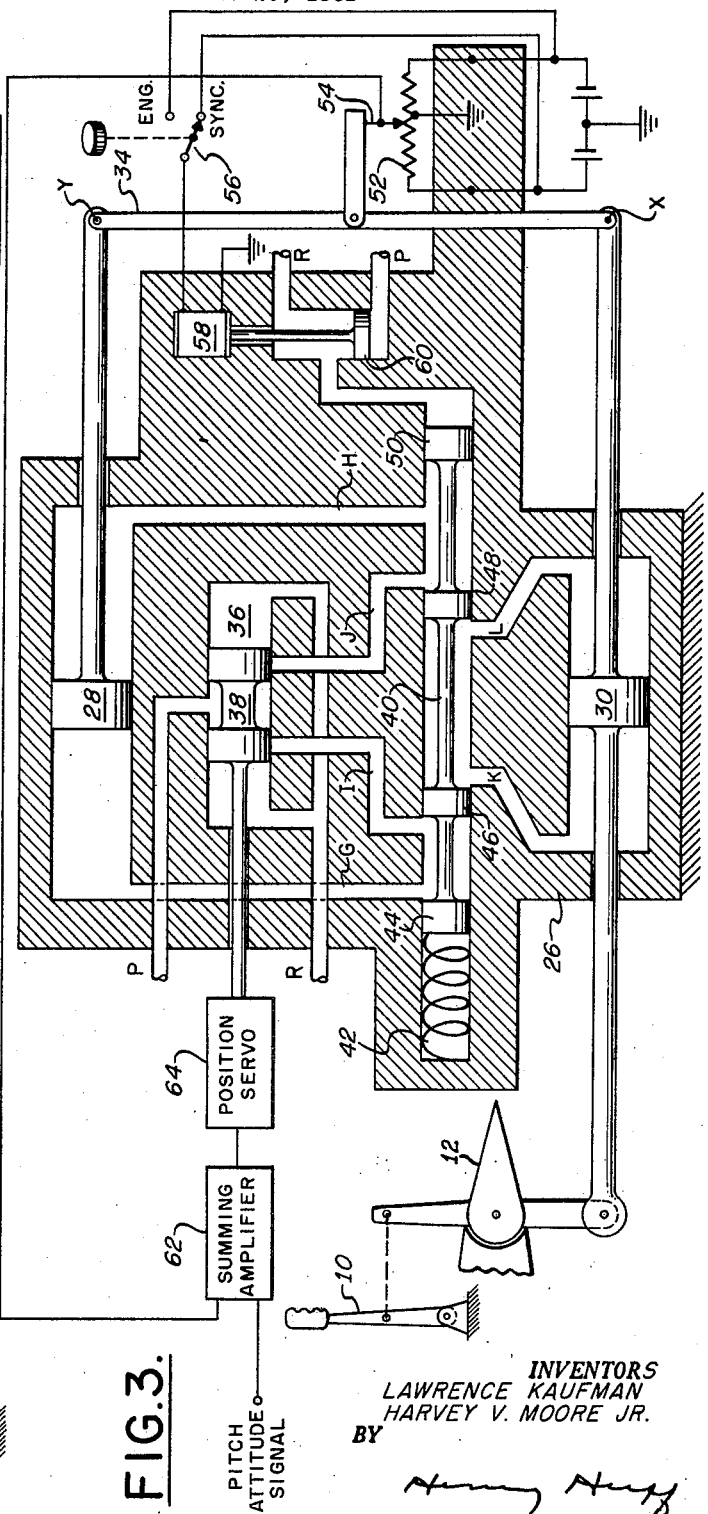
INVENTORS
LAWRENCE KAUFMAN
HARVEY V. MOORE JR.
BY
ATTORNEY

United States Patent Office 3,128,968
Patented Apr. 14, 1964

3,128,968
AIRCRAFT CONTROL SERVO APPARATUS
HAVING SIGNAL MEMORIZING MEANS
Lawrence Kaufman, West Hartford, Conn., and Harvey V. Moore, Jr., Phoenix, Ariz., assignors to Sperry Rand Corporation, Great Neck, N.Y., a corporation of Delaware
Filed Oct. 25, 1961, Ser. No. 147,653
13 Claims. (Cl. 244—78)

This invention relates in general to aircraft flight control systems and more particularly to synchronizing apparatus for use therewith, each such synchronizing apparatus being necessary to assure that its respective flight control system will maintain the attitude that an aircraft has at the instant the flight control system is engaged.

Flight control systems generally have two modes of operation: a synchronized mode and an engaged mode. Typically, such systems have their control surface servos connected to respective control surfaces by means of clutches, each clutch being engaged during the engaged mode and being disengaged during the synchronized mode. Each control surface servo is provided with a transducer which produces a signal representing the servo position output (regardless of whether the clutch is engaged or disengaged). The transducer output signal is applied then, together with a craft attitude signal, to a comparison device; the comparison device produces an output error signal, representing the difference between its input signals, which is applied to and constantly drives the servo so as to cancel the error signal, i.e. the servo is driven constantly to a null position. When the flight control system is engaged, the control surface servo is unaffected since instantaneously no error signal is applied to it. However, as the craft attitude changes, an error signal starts to appear which causes the servo to move the control surface (through its engaged clutch), thereby returning the craft to the attitude it had at the instant the system was engaged and cancelling the error signal.

The present invention enables a flight control system to have a synchronized mode without clutches and like devices. For synchronization, as herebefore discussed, apparatus embodying the present invention provides a signal representing the deflection of a craft control surface and applies that signal together with the output signal from a summing device to a subtracting device. The subtracting device operates to subtract the latter-named signal from the former-named signal, thereby producing a remainder signal which is simultaneously memorized and applied to the summing device. The summing device also receives a signal representing the craft attitude and produces an output signal representing the algebraic sum of its two input signals, the attitude signal being of a sense opposite that of the surface deflection signal.

When the control stick of a craft in which the invention is employed is moved to deflect a control surface (and thereby cause the craft attitude to change, for example, from level flight) the subtracting device instantaneously has an output signal, i.e. the surface deflection signal, which is added algebraically to an attitude signal by the summing device; this causes the summing device to have no output signal. As the control stick, and therefore the control surface, is returned to its neutral position, the craft attitude signal continues to increase while the surface deflection signal decreases. This causes an error signal to start to be applied to the subtracting device from the summing device. Since this error signal has a sense opposite that of the decreasing surface deflection signal, the output signal from the subtracting circuit continues to increase, thereby continuing to cause the summing device to have no output signal. That is, a signal is continuously memorized and applied to the summing device to cancel the attitude signal applied to that device.

After engaging the flight control system, the output signal from the summing device is applied to the control surface servo which operates whenever the attitude signal changes from the value it had at the instant the system was engaged.

A principal object of the invention is to provide apparatus for automatically synchronizing the operation of a flight control system with the instantaneous attitude of an aircraft.

Another object of the invention is to provide apparatus for preventing commanded movement of the control surfaces of a craft at the instant its flight control system is engaged.

Another object of the invention is to provide a self-synchronizing hydraulic actuator that embodies features of the present invention.

The invention will be described with reference to the figures wherein:

FIG. 1 is a block diagram of apparatus embodying the invention,

FIG. 2 is a diagram useful in describing the invention, and

FIG. 3 is a cutaway view of a self-synchronizing actuator which operates in accordance with the present invention.

Referring to FIG. 1, a control stick 10 is connected to an aircraft elevator 12 and has a pick-off 14 that produces a signal representing the deflection of the elevator 12. The sense of the signal produced by the pick-off 14 is such that commanded climbs and dives are represented respectively by negative and positive signals. The output signal from the pick-off 14 is applied through a switch 16a to a subtraction circuit 18, e.g. the subtraction circuit shown and described in Radiation Laboratory Series, vol. 21, McGraw Hill Book Co., Inc., page 36, FIG. 3.4(b). A summing circuit 20, e.g. the circuit shown and described in Radiation Laboratory Series, vol. 21, McGraw Hill Book Co., Inc., page 36, FIG. 3.4(a), receives a signal representing the instantaneous pitch attitude of the aircraft, the pitch attitude signal being positive for nose-up attitudes and negative for nose-down attitudes. It is to be realized that, though the invention is described in conjunction with an aircraft pitch axis onlly, it is employable with apparatus controlling the flight of a craft about all of its axes. The output signal from the summing circuit 20 is applied through a switch 16b to the subtraction circuit 18. The switches 16a and 16b are ganged together and are operated by a knob 22. The subtraction circuit 18 subtracts the output signal from the summing circuit 20 from the signal produced by the control stick pick-off 14. A memory device 24, e.g. a capacitor, receives and stores the output signal from the subtraction circuit 18; the stored signal is applied then to the summing circuit 20 wherein it is added algebraically to the pitch attitude signal. Preferably, the signal from the memory device, before being applied to the summing circut 20, is passed through a high pass filter to remove any long term components of the elevator deflection signal resulting from changes in the craft trim.

The apparatus of FIG. 1 now will be described in the following hypothetical situation: the pilot manipulates the craft control stick 10 to cause the craft to assume a particular nose-down attitude and, thereafter, he engages the flight control system so as to cause the craft to continue to fly at that attitude. When the pilot so manipulates his control stick 10, a positive-going elevator deflection signal is produced by the pick-off 14. At the same time, a negative-going pitch attitude signal is also produced because the craft is nosing over in response to its deflected elevator. See FIG. 2. As the craft approaches the particular pitch attitude desired, the pilot starts (point P) to return the control stick 10 back to its neutral position, thereby streamlining the elevator 12 and decreasing the elevator deflection signal. However, the craft continues to nose over until the stick is in its neutral position, i.e. when the elevator is no longer deflected. Up to point P, the signal from the pick-off 14 is the only signal applied to the subtraction circuit 18. This is because the pitch attitude signal is added continuously to the output signal from the pick-off 14, thereby preventing an error signal from appearing at point B of FIG. 1. After point P, the summing circuit 20 starts to produce an output signal because the signal from the pick-off 14, i.e. the signal at point A of FIG. 1, starts to diminish whereas the pitch attitude signal continues to increase negatively. This causes an error signal that is negative to be applied to the subtraction circuit. Since the subtraction circuit 18 subtracts a negative signal from a positive elevator deflection signal, it effectively adds the signals at points A and B, thereby causing the memory device 24 to store a positive-going signal. The output signal from the memory device 24 is then applied to and continuously causes the summing circuit 20 to have no output signal.

The operation of the apparatus of FIG. 1 in the synchronized mode may be looked at in the following manner: up to point P, the memory device 24 stores a signal representing the elevator deflection. After point P, the memory is forced to store a signal representing the sum of an artificially produced signal and the elevator deflection signal, the artificially produced signal (signal C, FIG. 2) rising in magnitude as the elevator deflection signal falls in magnitude. As the output signal from the memory 24 starts to decrease in magnitude a signal starts to appear at the output of the summing circuit 20 which causes the stored signal to return to a quiescent level. From point Q on, the elevator is streamlined and there is no elevator deflection signal.

At point R, a gust appears causing the craft pitch attitude signal to increase in a positive direction, i.e. the craft starts to level off. This causes the summing circuit 20 to have a positive-going output signal which, as before, is converted to a negative-going signal by the subtraction circuit 18, thereby causing the signal stored in the memory device 24 to decrease in a negative direction, i.e. the signal stored by the memory 24 gets less negative after point R than before such point. As a result, there is substantially no output signal from the summing circuit 20. When the pilot returns the craft to the particular nose-down attitude desired, the output signal from the memory 24 increases in a positive direction along with the attitude signal which increases in a negative direction, thereby preventing a signal from appearing at the output of the summing circuit 20.

With the craft flight control system in the engaged mode of operation, the output signal from the summing circuit 20 ceases to be applied to the subtraction circuit 18 and is applied, instead, directly to the elevator control servo via the switch 16b. After the system is engaged, the output signal from the memory device serves as a reference signal for the craft pitch attitude signal. Therefore, when a wind gust now causes the craft to depart from the particular nose-down attitude desired, e.g. by causing the craft to nose up, an error signal (represented by the cross-hatched area of FIG. 2) starts to appear. This signal, as herebefore stated, is applied to the elevator servo which causes the craft to assume the desired nose-down attitude.

Referring to FIG. 3, the presently preferred form of the invention has a self-synchronizing actuator 26 which performs the functions of elements 14, 16, 18 and 24 of FIG. 1. The actuator 26 has a synchronizing section and an actuating section. The synchronizing section is provided with a piston 28 and the actuating section is provided with a piston 30. The pistons 28 and 30 are connected to a bar linkage 34 which operates to perform the function of the subtraction circuit 18. A servo valve 36 having a spool 38 supplies hydraulic fluid to drive the piston 28 or the piston 30 depending on whether a spool 40 is in the position shown or whether the spool 40 is positioned so as to compress a spring 42. The spool 40 is provided with four lands 44, 46, 48 and 50. A pick-off, e.g. a grounded center tapped potentiometer 52 having a wiper 54, produces a signal representing the algebraic difference between the amounts that the pistons 28 and 30 move. A switch 56 applies a D.C. signal to a relay 58, the polarity of the signal depending on whether the switch is in a position designated Sync. or in a position designated Engage. The relay 58 moves a piston 60 so that hydraulic fluid is applied to move the spool 40 only when the switch 56 is in the Engage position. Valve orifices designated P and R respectively apply and return hydraulic fluid to a hydraulic fluid supply. The piston 30 in addition to being tied to the bar linkage 34 is tied also to the elevator 12 which is positionable by the control stick 10. The signal on the wiper 54 is applied to a summing amplifier 62 which receives a signal representing the craft pitch attitude also. The summing amplifier 62, providing the same function as the summing circuit 20, has its output signal applied to a position servo 64; the servo 64 positions the spool 38 of the valve 36 from its neutral position in proportion to the magnitude of the summing amplifier 62 output signal.

When the craft is flown with the flight control system in the synchronized mode, i.e. with the switch 56 in the Sync. position, the pilot maintains control of his craft by means of his control stick. As described in conjunction with FIG. 2, a push forward on the control stick 10 causes the elevator 12 to move downward and the craft to dive; when the elevator moves downward, the piston 30 moves to the left. As the piston 30 moves to the left, point X on the bar linkage 34 also moves to the left, thereby causing a positive signal to appear on the wiper 54. (The position of point X is the mechanical signal equivalent of the signal appearing at point A of FIG. 1.) This signal is applied to the summing amplifier 62; at the same time, a negative signal is also applied to the amplifier 62, this negative signal resulting when the craft dives in response to its downwardly deflected elevator. As a result the summing amplifier 62 has no output error signal and the spool 38 remains in its neutral position.

As the pilot approaches the particular nose-down attitude desired, he returns the elevator 12 to its streamlined position. In so doing, the positive signal on the wiper 54 starts to diminish while the signal representing the attitude of the craft continues to increase negatively. (The reason why the attitude signal continues to increase negatively is that the elevator 12, though being returned to a streamlined position, is still deflected, but decreasingly so, and causes therefore the craft attitude to continue to change.) This causes a negative error signal to start to appear at the output of the summing amplifier 62. The position servo 64 in response to this error signal moves the spool 38 to the right, thereby permitting hydraulic fluid to be conveyed to the right side of the piston 28. This causes the piston 28 to move point Y on the bar linkage 34 to the left as the pilot returns point X on the linkage 34 to the right. (The position of point Y is the mechanical signal equivalent of the signal appearing at point A to FIG. 1. That is, the mechanical signal positioning of point Y is in accordance with the summing amplifier 62 output signal much the same as the FIG. 1 circuit 20 determines the signal at point B.) As a result, the wiper 54 continually picks off a positive signal representing the algebraic difference between the amounts that the points X and Y move. Similar to the apparatus of FIG. 1, the wiper 54 is forced to move in proportion to the algebraic sum of an artificially caused movement of the point Y and movement of point X (which is caused by the pilot when he moves his control stick). Therefore, with the pilot flying his craft at a nose-down attitude, but with the elevator 12 streamlined, the piston 30 will be in its neutral, i.e. central, position and the piston 28 will be to the left of its central position in proportion to the amount the craft is "nosed down." Now, if a gust occurs causing the craft to start to nose up, a positive error signal will start to appear at the output of the summing amplifier 62, i.e. the instantaneous positive feedback signal from the wiper 54 will be of a greater magnitude than the instantaneous negative pitch attitude signal, which will cause the spool 38 to the servo valve 36 to move to the left. This will allow hydraulic fluid to be applied to the left side of the piston 28 which will move that piston to the right, thereby causing the potential on the wiper 54 to decrease as the nose-down attitude of the craft decreases, i.e. the positive signal on the wiper 54 is made to get smaller to balance the lessended pitch attitude signal and hence causes the summing amplifier 12 to be driven to a null state. Therefore, during the synchronization mode, the feedback signal, as before, will constantly follow-up on and cancel the error signal at the output of the summing amplifier 62.

During the engaged mode, i.e. with the switch 56 in the Engage position, the relay 58 is energized to move the piston 60 and permit hydraulic fluid to be applied to the right side of the spool 40. When such is the case, the lands 50 and 46 prevent hydraulic fluid from passing to and from the respective sides of the piston 28 by closing off conduits G and H; this locks the piston 28 in the position it had when the switch 56 was moved to the Engage position. With the spool 40 so positioned hydraulic fluid may be applied from the servo valve 36 to either the right or the left side of the piston 30, i.e. hydraulic fluid may flow from conduits I and J to conduits K and L respectively. Now, with the craft flying at the particular desired nose-down attitude, when a gust causes the craft to start to nose up, a positive error signal starts to appear at the output of the summing amplifier 62. This error signal causes hydraulic fluid to be applied from the servo valve 36 to the left side of the piston 30, thereby moving the elevator 12 downwardly and causing the craft to continue to hold its nose-down attitude. As the piston 30 moves to the right in response to a positive signal being applied to the position servo 64, the potential on the wiper 54 decreases, thereby causing the servo spool 38 to return to its neutral position. Regardless of the position of the elevator 12, the servo spool 38 will always return to its neutral position so that the servo valve 36 will be free to apply the necessary amount to either side of the piston 30.

While the invention has been described in its preferred embodiments, it is to be understood that the words which have been used are words of description rather than of limitation and that changes made within the purview of the appended claims may be made without departing from the true scope and spirit of the invention in its broader aspects.

What is claimed is:

1. Apparatus for use with an aircraft automatic flight control system for assuring that said system will maintain the attitude said aircraft has when said sysem is engaged comprising summing means adapted to receive a signal representing the instantaneous attitude of the aircraft about one of its axes, means producing a signal representing the deflection of a craft control surface associated with said axis, means adapted to subtract said summing means output signal from said surface deflection signal when said system is not engaged, means adapted to store a signal representing the result of said subtraction, said storing means applying its output signal to said summing means, whereby said summing means produces a signal representing the sum of its input signals, and means for applying said summing means output signal to said system when said flight control system is engaged.

2. Apparatus for use with an aircraft flight control system for preventing a command signal from being applied thereto at the instant said system is engaged comprising summing means adapted to receive a signal representing the instantaneous attitude of the aircraft about one of its axes, means producing a signal representing the deflection of a craft control surface associated with said axis, means adapted to subtract said summing means output signal from said surface deflection signal when said system is not engaged, means adapted to store a signal representing the result of said subtraction, said storing means applying its output signal to said summing means, whereby said summing means produces a signal representing the sum of its input signals, and means responsive to apply said summing means output signal to said system when said flight control system is engaged.

3. Apparatus for synchronizing the operation of an aircraft flight control system with the instantaneous attitude of the craft about an axis prior to engaging said system comprising signal summing means, signal subtracting means, means producing a signal representing the amount a craft control surface associated with said axis is deflected, said signal subtracting means subtracting the summing means output signal from said surface deflection signal when said system is disengaged, and means receiving and storing a signal representing the output from said subtracting means, said storing means applying its output signal to said summing means, said summing output signal being applied to said flight control system when said system is engaged.

4. In combination with a flight control system for controlling the flight of an aircraft about one of its axes, apparatus for assuring that said system will maintain the attitude of said craft at the instant said system is engaged comprising summation means adapted to receive a signal representing the instantaneous attitude of the craft, subtraction means adapted to receive a signal representing the deflection of a control surface associated with said axis, said subtraction means producing a signal prior to engagement of said flight control system representing the output signal from the summation means subtracted from the signal representing the control surface deflection, means for applying the output signal from said summation means to the flight control system when said flight control system is engaged, and means applying continuously the output signal from said subtraction means to said summation means, said means applying the output signal from said subtraction means to said summation means also applying to said summation means the output signal from said subtraction means at the instant said system is engaged.

5. Valve apparatus having synchronized and engaged modes of operation comprising a servo valve, first and second piston means, signal producing means responsive to movement to both said pistons, said signal producing means producing signals of one sense when said piston means move in a first direction from their neutral positions and producing signals of a different sense when they move in a second direction from their neutral positions, manually operable switch means having one position for said synchronized mode and one position for said engaged mode, said switch means making said servo valve operable with said first piston means and enabling said second piston means to be moved freely during said synchronized mode of operation, said switch means during said engaged mode preventing said first piston means from moving and making said servo valve operable with said second piston means, said second piston means being adapted to be connected to an aircraft control surface.

6. Valve apparatus having synchronized and engaged modes of operation comprising a servo valve, first and second piston means, signal producing means responsive to movement to both said piston means, said signal producing means producing signals of one sense when said piston means move in a first direction from their neutral positions and producing signals of a different sense when they move in a second direction from their neutral positions, selective means for either making said servo valve operable with said first piston means while enabling said second piston means to be moved freely during said synchronized mode of operation, or during said engaged mode preventing said first piston means from moving and making said servo valve operable with said second piston means, said second piston means being adapted to be connected to an aircraft control surface.

7. Self synchronizing valve apparatus comprising first and second pistons, a bar linking said pistons, said second piston being the only piston adapted to be driven exclusively and simultaneously with an aircraft control surface, selection means for either permitting said second piston to be positioned by said control surface while positioning said first piston in accordance with a command signal, or in another mode locking said first piston in place and driving said second piston in accordance with a command signal, and means responsive to movements of said bar to produce a reference signal for said command signal, said reference signal being representative of the amount that a central part of the bar moves laterally.

8. Flight control apparatus consisting of servo means and valve means, said valve means having a synchronized and engaged mode of operation comprising a servo valve, first and second piston means, signal producing means responsive to movement of both said pistons, said signal producing means producing signals of one sense when said piston means move in a first direction from their neutral positions and producing signals of a different sense when they move in a second direction from their neutral positions, manually operable switch means having one position for said synchronized mode and one position for said engaged mode, said switch means making said servo valve operable with said first piston means and enabling said second piston means to be moved freely during said synchronized mode of operation, said switch means during said engaged mode preventing said first piston means from moving and making said servo valve operable with said second piston means, said second piston means being adapted to be connected to an aircraft control surface, said servo valve being positioned by said servo means and said servo means being adapted to operate said servo valve in accordance with the difference between a command signal and the signal from said signal producing means.

9. Flight control apparatus consisting of servo means and valve means, said valve means comprising a servo valve, first and second piston means, signal producing means responsive to movement of both said pistons, said signal producing means producing signals of one sense when said piston means move in a first direction from their neutral positions and producing signals to a different sense when they move in a second direction from their neutral positions, selective means responsive to make said servo valve operable with said first piston means and to enable said second piston means to be moved freely during a synchronize mode of operation, said responsive means during an engage mode preventing said first piston means from moving and making said servo valve operable with said second piston means, said second piston means being adapted to be connected to an aircraft control surface, said servo valve being positioned by said servo means and said servo means being adapted to operate said servo valve in accordance with the difference between a command signal and the signal from said signal producing means.

10. Valve apparatus comprising a main member provided with first and second cylinders, first and second piston means positionable respectively within said cylinders, differential means linking said first and second piston means, said second piston means being adapted to be positioned by a control member, selective means responsive during one mode to position said first piston means only in accordance with command signals and, during another mode position said second piston means in accordance with command signals while preventing movement of said first piston means, and signal producing means connected to produce a signal representing the output of said differential means.

11. Valve apparatus comprising a main member provided with first and second cylinders, first and second piston means positionable respectively within said cylinders, a bar linking said first and second pistons, said second piston means alone being adapted to be positioned by a control surface on an aircraft, selective means responsive during one mode permitting said first piston means only to be positioned in accordance with command signals and, during another mode, permitting said second piston means to be positioned in accordance with command signals while preventing movement of said first piston means, and signal producing means connected to produce a signal repersenting the movement of said bar.

12. The apparatus of claim 10 wherein said selective means is valve apparatus responsive during the first mentioned mode to supply hydraulic fluid to drive only said first piston means and during the second mentioned mode to supply hydraulic to drive said second piston means while preventing hydraulic fluid from flowing to and from the respective sides of said first piston means.

13. The apparatus of claim 11 wherein said selective means is valve apparatus responsive during the first mentioned mode to supply hydraulic fluid to drive only said first piston means and during the second mentioned mode to supply hydraulic fluid to drive said second piston means while preventing hydraulic fluid from flowing to and from the respective sides of said first piston means.

References Cited in the file of this patent
UNITED STATES PATENTS
2,940,428        Brandstadter _____ June 14, 1960